United States Patent [19]

Foster

[11] Patent Number: 4,502,879
[45] Date of Patent: Mar. 5, 1985

[54] MOULD COOLING ARRANGEMENT FOR A GLASSWARE FORMING MACHINE

[75] Inventor: Thomas V. Foster, Doncaster, England

[73] Assignee: Emhart Industries, Inc., Farmington, Conn.

[21] Appl. No.: 589,916

[22] Filed: Mar. 15, 1984

[30] Foreign Application Priority Data

Apr. 8, 1983 [GB] United Kingdom ................. 8309672

[51] Int. Cl.³ .............................................. C03B 9/38
[52] U.S. Cl. ........................................ 65/267; 65/265; 65/319; 65/356
[58] Field of Search .................... 65/29, 162, 265, 267, 65/319, 356, 83; 136/213, 236.1, 239

[56] References Cited

U.S. PATENT DOCUMENTS 4,104,046  8/1978  McCreery ........................ 65/356 X
4,142,884  3/1979  Jones, Jr. ......................... 65/265 X
4,361,434  11/1982  Schneider ........................ 65/265

FOREIGN PATENT DOCUMENTS 2346294  12/1975  France ............................. 65/356

Primary Examiner—Arthur Kellogg
Attorney, Agent, or Firm—H. Samuel Kieser

[57] ABSTRACT

The mould arrangement comprises a mould body defining a mould cavity and cooling passages each having an opening in an upper surface of the mould body around an opening of the mould cavity. Air delivery means for delivering cooling air to the cooling passages comprises an annular chamber movable into an operative position in which openings in the bottom of the chamber communicate with the openings of the cooling passages so that air blown into the annular chamber enters the cooling passages. When the chamber is in its operative position, access can be obtained to the mould cavity through the center of the annular chamber.

9 Claims, 5 Drawing Figures

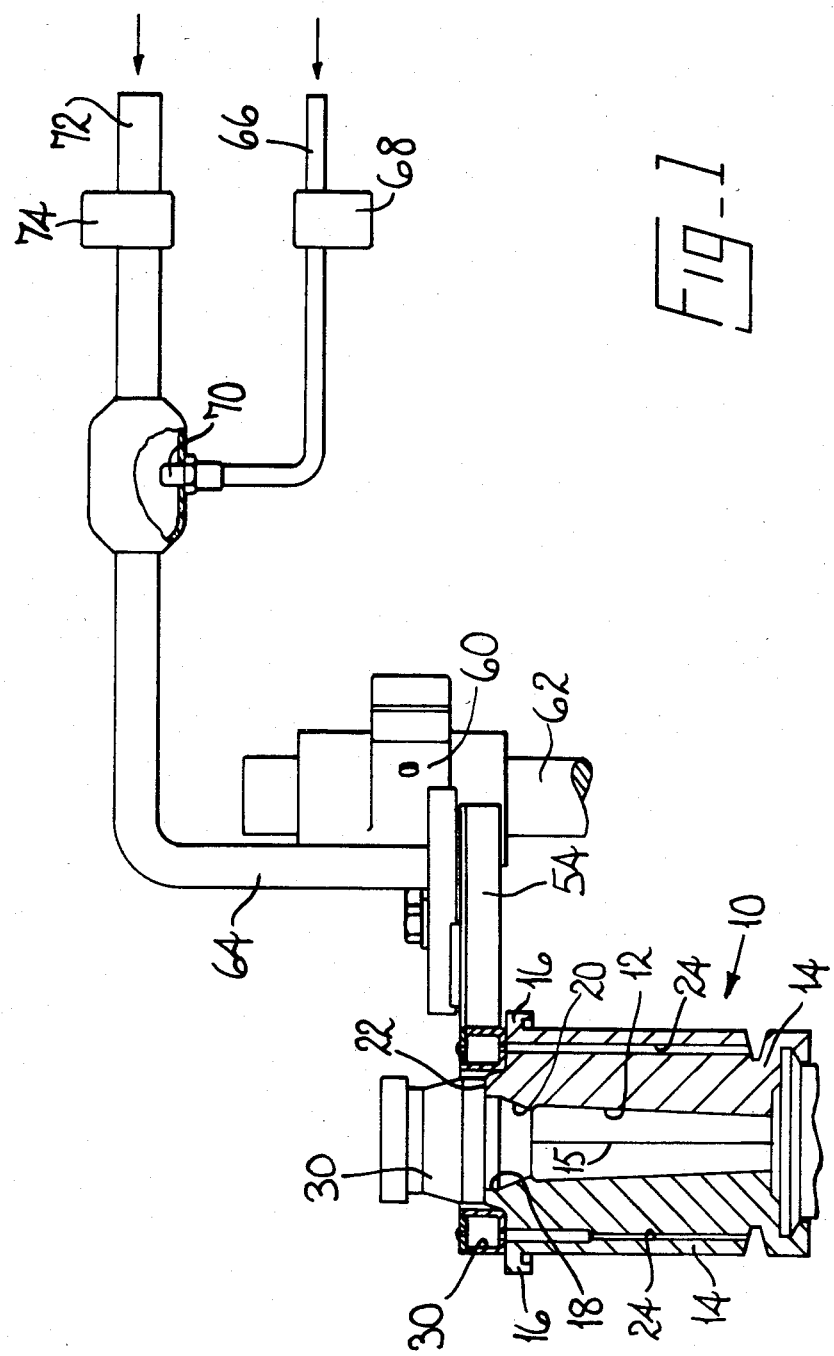
Fig_1

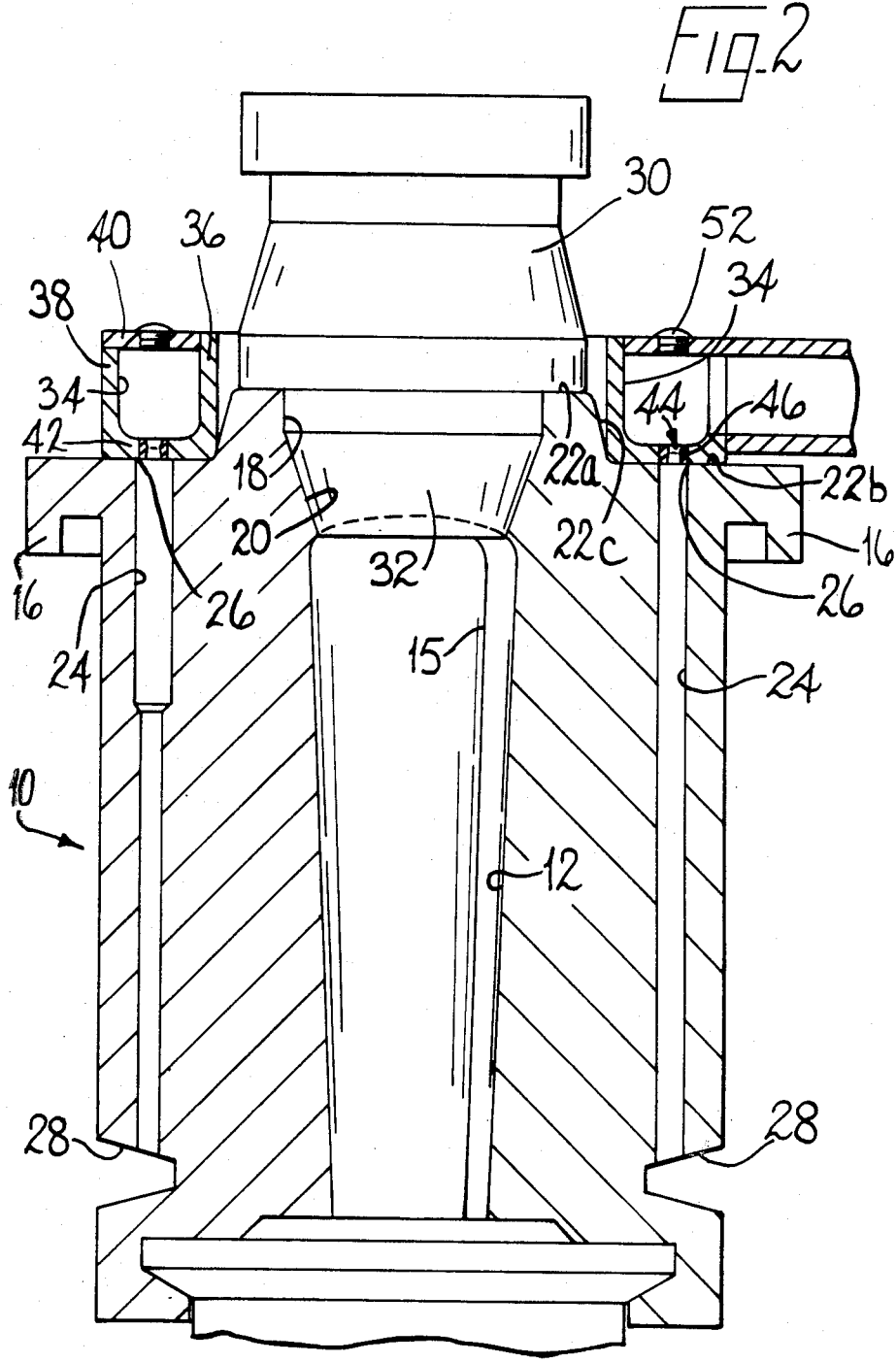

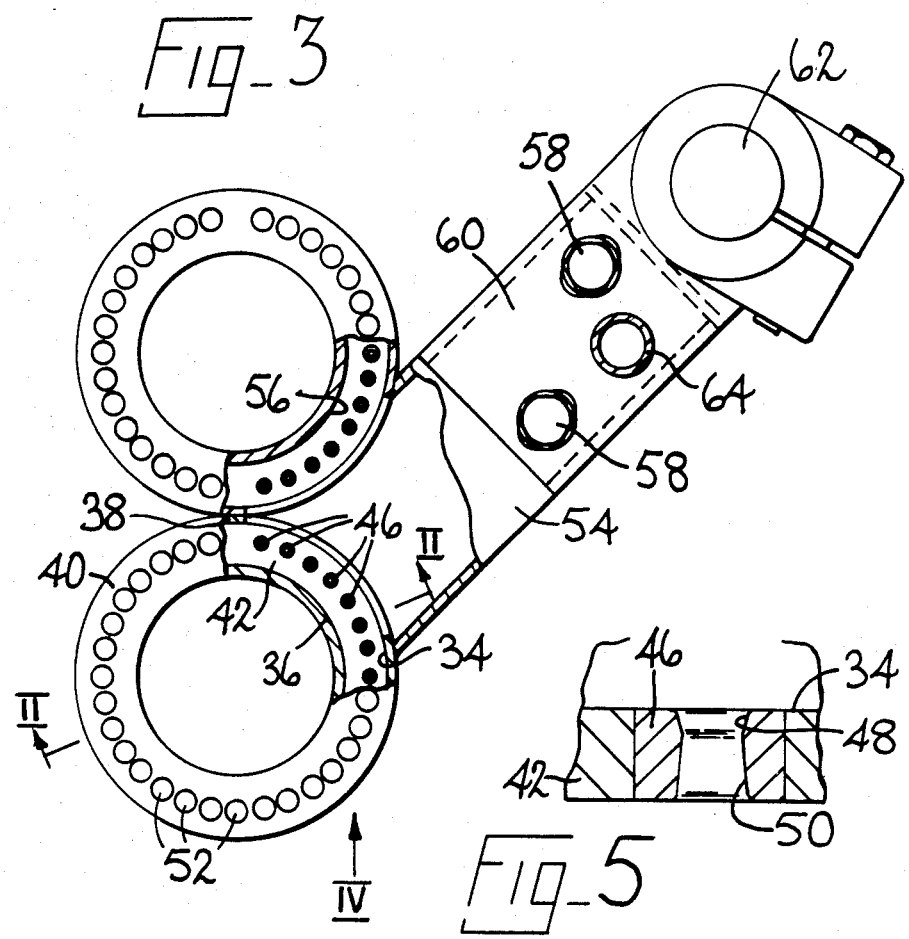
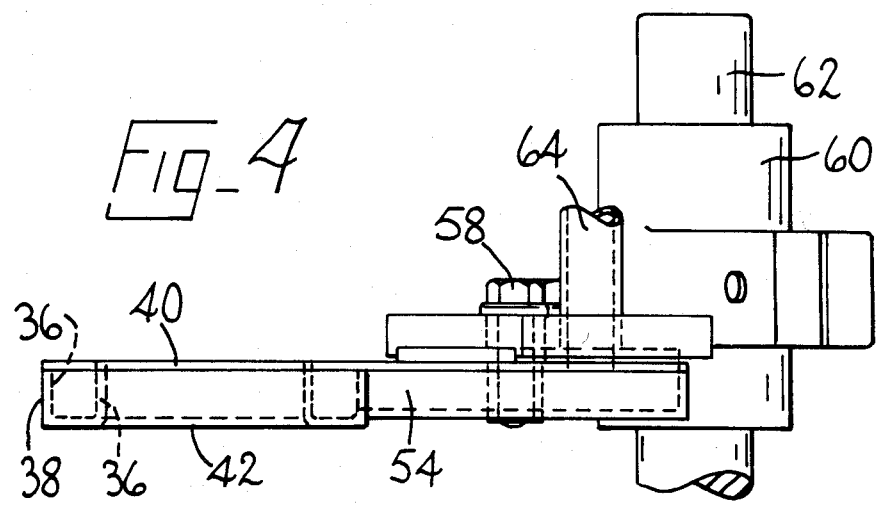

MOULD COOLING ARRANGEMENT FOR A GLASSWARE FORMING MACHINE

BACKGROUND OF THE INVENTION

This invention is concerned with a mould arrangement for use in a cyclicly operating glassware forming machine.

In a glass container manufacturing machine of the so-called "individual section" type, a number of container making units or sections are arranged side by side, are fed with glass from a common source, and feed their output to a common conveyor. Each of these sections has at least one blank or parison mould in which a parison is formed from a gob of molten glass delivered to the mould, and at least one final or blow mould in which the parisons are blown to the shape of the required container. The blank mould comprises two side portions which are mounted on supporting arms which are movable to move the side portions towards one another in to a closed position in which the side portions co-operate to form a mould cavity and to move the side portions into an open position to allow moulded parisons to be removed from the mould. When the side portions are in their closed position, a funnel guides a gob of molten glass into the mould cavity through an upwardly facing opening of the cavity. After the gob has entered the mould cavity, a baffle is positioned on the mould to close the opening of the mould cavity and the parison is formed either by blowing the gob to the shape of the cavity or by pressing a plunger into the gob, in both cases the parison forming mechanism is located beneath the mould cavity. The final mould of the machine also comprises two side portions which are movable between open and closed positions thereof, in the closed position the side portions co-operating with a fixed bottom plate to define a mould cavity. The side portions are moved to their closed position while a parison is between them so that the parison is enclosed in the mould cavity and a blowhead is introduced which blows air through an upwardly facing opening of the cavity so that the parison is caused to expand and take up the shape of the mould cavity. The side portions of the final mould are then moved to their open position after removal of the blowhead so that the finished container can be removed from the mould.

Since the moulds of an individual section type machine absorb heat from the glass at a rate which is faster than the heat can be dissipated to the surrounding atmosphere without additional cooling, the moulds of such a machine are supplied with cooling means which cool the mould so that it remains at a substantially constant temperature during successive cycles of operation of the machine. Because the sections of the machine need to be close together, for reasons of glass supply, only very limited space is available around each mould for the provision of cooling means. One solution to this problem is to feed the cooling air through the frame of the machine section to a vertical cooling stack which is provided with nozzles which direct air on to the outside of the mould. This solution, however has the disadavantage that the arms supporting the side portions of the mould interfere with the flow of air to the mould and also it is difficult to provide differential cooling around the mould as may be required. Furthermore, such cooling stacks are a source of undesirable noise. In another type of cooling means, the cooling air is supplied through the supporting arms of the side portions of the mould to a chamber around the mould or to passages within the mould. This type has the disadvantage that it requires expensive machining of the arms, to allow both for the movement of the arms and for the flow of the cooling air. Furthermore, as a seal has to be provided between the arm and the side portion of the mould, delays occur in changing moulds.

In the specification of U.S. patent application Ser. No. 527,589 filed Aug. 29, 1983 in the name of T. V. Foster there is described a mould arrangement in which cooling air can be supplied to side portions of the mould without the cooling air passing through the supporting arms. In this mould arrangement, the passages in each side portion of the mould each have an entrance in a bottom surface of that side portion and the arrangement also comprises a plenum chamber and air supply means arranged to supply mould cooling air to the plenum chamber for a predetermined period in each cycle of operation of the machine during which the side portions are in their closed position, the plenum chamber extending beneath the side portions and having exits which, when the side portions are in their closed position, communicate with the entrances of the passages so that air can leave the plenum chamber and pass through the passages. This arrangement provides a satisfactory way of providing cooling for the final or blow mould of the machine but is not readily applicable to the blank mould since the plenum chamber cannot extend beneath the mould as this area is occupied by the plunger mechanism or the air blowing mechanism used to form the gob into a parison.

It is an object of the present invention to provide a mould arrangement in which cooling air can be supplied to side portions of a blank mould without the cooling air passing through the supporting arms and in which the above mentioned disadvantages are overcome.

BRIEF SUMMARY OF THE INVENTION

The invention provides a mould arrangement for use in a cyclicly operating glassware forming machine, the arrangement comprising a mould body defining a mould cavity in which molten glass can be moulded, the mould cavity having an upwardly facing opening, cooling passages extending vertically in the mould body and each having an opening in an upper surface of the mould body which extends around the opening of the mould cavity, and air delivery means operable to deliver cooling air to said passages through the openings thereof so that the air flowing in the passages acts to cool the mould body, the air delivery comprising an annular chamber, moving means operable to move the annular chamber between an operative position thereof in which a lower surface of the chamber overlies the upper surface of the mould body and an out-of-the-way position thereof, and blowing means operable to blow cooling air into the annular chamber when the chamber is in its operative position, the annular chamber being arranged so that, when it is in its operative position, access may be obtained through the centre of the annular chamber to the opening of the mould cavity, the chamber having openings in its lower surface which, when the chamber is in its operative position, each communicate with an opening of one of the cooling passages so that air blown into the annular chamber passess through the openings into the cooling passages.

In a mould arrangement in accordance with the last preceding paragraph, access to the cooling passages in the mould is obtained without the necessity for expensive machining of the mould supporting arms and without the use of a cooling stack so that the noise created by a cooling stack is avoided and differential cooling can be arranged around the mould by positioning the cooling passages in appropriate places.

In order to increase the flow of air into the cooling passages and to further reduce the noise caused by the air flow, each of the openings in the lower surface of the annular chamber may contain a nozzle defining a passage for the air leaving the chamber, which passage has a portion communicating with the chamber which converges away from the chamber.

In order to increase the cooling effect of the air flowing through the cooling passages in the mould body, the mould arrangement may also comprise water supply means operable to entrain droplets of water into the air blown by the blowing means to thereby increase the cooling effect of the air.

Conveniently, the cooling passages may communicate with an annular groove formed in the mould body which provides a common exhaust for all the passages.

Conveniently, the annular chamber may be mounted on an arm which forms a passage for the cooling air between the blowing means and the annular chamber, the arm being mounted for vertical movement and for pivoting movement about a vertical axis so that the annular chamber can be moved between its operative and out-of-the-way positions by a combination of these movements. It is conventional in individual section machines, for the movements of the funnel and baffle associated with the blank mould arrangement to be mounted on such mechanisms and advantageously where the mould body defines a funnel portion connecting the opening in the upper surface to the mould cavity, the moving means operable to move the annular chamber may be the mechanism conventionally used to move a funnel into and out of alignment with the opening of the mould cavity so that the funnel can guide a gob of molten glass into the mould cavity. Where the machine is operating in the so-called "double gob" mode in which there are two blank moulds arranged side by side and two final moulds also arranged side by side which operate simultaneously to create two parisons and two containers at a time, a further annular chamber may be mounted on the arm for movement with said annular chamber, said further annular chamber being arranged, when in its operative position, to deliver air to cooling passages in a further mould body of the arrangement. Further annular chambers may be added if the machine is operating with more than two blank moulds.

Although the mould arrangement may be a blank mould arrangement of a glassware forming machine of the individual section type arranged to mould parisons from gobs of molten glass received in the mould cavity in which case the annular chamber is arranged, when in its operative position, to receive a baffle which acts to close the opening of the mould cavity, it may advantageous in some circumstances to apply the invention to the final mould arrangement of the machine arranged to mould parisons received in the mould cavity thereof into containers. In this case, a blowhead of the mould arrangement, through which air can be blown into the mould cavity to cause a parison therein to expand, may be mounted in the centre of the annular chamber for movement therewith.

BRIEF DESCRIPTION OF THE DRAWINGS

There now follows a detailed description, to be read with reference to the accompanying drawings, of a mould arrangement which is illustrative of the invention. It is to be understood that the illustrative mould arrangement has been selected for description by way of example and not of limitation of the invention.

In the drawings:

FIG. 1 is a diagrammatic view, partially in section, of the illustrative mould arrangement;

FIG. 2 is a cross-sectional view taken vertically through a mould body of the illustrative mould arrangement, on a larger scale than FIG. 1 (the direction of the section is indicated by the line II—II in FIG. 3);

FIG. 3 is a plan view, on a smaller scale than FIG. 2, partially in section, of an arm and annular chambers of the illustrative mould arrangement;

FIG. 4 is an elevational view taken in the direction of the arrow IV in FIG. 3; and FIG. 5 is a detailed view of a nozzle of the illustrative mould arrangement.

DETAILED DESCRIPTION OF PREFERRED EMBODIMENT OF THE INVENTION

The illustrative mould arrangement is a blank mould arrangement for use in a cyclicly operating glassware forming machine of the individual section type. The arrangement comprises a mould body 10 defining a mould cavity in which molten glass can be moulded. The mould body 10 comprises two side portions 14 which are supported by means of hooks 16 thereof on supporting arms (not shown) which in a conventional manner are arranged to move the side portions 14 between a closed position thereof (shown in the drawings) and an open position thereof (the split line 15 between the portions 14 is visible in FIGS. 1 and 2). When in their closed position, the side portions 14 co-operate to define the mould cavity 12 in which a gob of molten glass, supplied to the mould cavity through an upwardly facing opening 18 thereof, can be moulded to the shape of a parison by parison forming means located at the bottom of the mould cavity 12 (not shown). The mould cavity 12 defined by the mould body 10 has an upwardly facing opening 18 as aforesaid and the mould body 10 also defines a funnel portion 20 connecting the opening 18 to the mould cavity. The opening 18 is in an upper surface 22 of the mould body which surface 22 is stepped as best seen in FIG. 2 having an annular portion 22a, a further annular portion 22b at a lower level and surrounding the annular portion 22a and a frusto-conical surface portion 22c connecting the surface portions 22a and 22b. The mould body 12 also defines cooling passages 24 which extend vertically in the mould body 10 and each have an opening 26 in the upper surface 22 of the mould body 10 which extends around the opening 18 of the mould cavity 12. The openings 26 form a ring around the opening 18 and are formed in the annular portion 22b of the surface 22. Some of the passages 24 are of constant diameter while others are stepped, having portions of different diameter, in order to concentrate the cooling effect of air flowing through the passages where it is required. An annular groove 28 is formed around the mould body 10 near the bottom thereof and the passages 24 communicate with the groove 28 so that the groove 28 provides a common exhaust for the passages to atmosphere.

The illustrative mould arrangement also comprises a baffle 30 which is movable between an opposite position in which a lower portion 32 of the baffle 30 extends into the opening 18 and the funnel portion 20 of the mould body 10 and forms an upper closing surface of the mould cavity 12. The baffle is moved by conventional moving means (not shown) which first swing it into alignment with the mould cavity 12 and then lower it vertically into the position shown in FIG. 2 in which it acts to close the top of the mould cavity 12.

The illustrative mould arrangement also comprises air delivery means operable to deliver cooling air to the passages 24 through the openings 26 thereof so that the air flowing in the passages 24 acts to cool the mould body 10. The air delivery means comprises an annular chamber 34, moving means operable to move the annular chamber between an operative position thereof and an out-of-the-way position thereof, and blowing means operable to blow cooling air into the annular chamber 34 when the chamber is in its operative position. The annular chamber 34 is bounded by an inner circular wall 36, an outer circular wall 38, an upper surface 40, and a lower surface 42, the upper and lower surfaces 40 and 42 being annular. When the chamber 34 is in its operative position, the annular lower surface 42 overlies the upper surface 22 of the mould body 10 being in close proximity to the annular surface portion 22b thereof (see FIG. 2). When the annular chamber 34 is in its operative position, (as shown in FIG. 1 and FIG. 2), access may be obtained through the centre of the annular chamber 34 to the opening 18 of the mould cavity. This access is required for the baffle 30 and also for a gob of molten glass before the baffle is put in position. The chamber 34 also has openings 44 in the lower surface 42 thereof. These openings 44 are arranged so that, when the chamber 34 is in its operative position, each communicates with an opening 26 of one of the cooling passages 24 so that air blown into the annular chamber 34 passes through the openings 44 into the cooling passages 24. Each of the openings 44 contains a nozzle 46 which is shown in detail in FIG. 5. Each nozzle 46 defines a passage for the air leaving the chamber 34, which passage has a portion 48 communicating with the chamber 34 and converging away from the chamber 34 and a divergent portion 50 which communicates with the portion 48 and with the opening 26 of the passage to which the nozzle 46 directs air. In a variation of the illustrative mould arrangement the portion 50 of the nozzle 46 may be made of constant diameter instead of divergent. The shape of the nozzle 46 reduces the noise caused as the air passes into the passages 24 and also prevents the air from becoming heated as it does so. The upper surface 40 of the annular chamber 34 contains holes which are aligned with the openings 44 and are used for removal of the nozzles 46 from the openings 44, these holes being plugged by cap screws 52.

The annular chamber 34 is mounted on an arm 54 which is of rectangular cross section and is hollow to provide a passage for the air to the annular chamber 34. The air passing through the arm 54 enters the annular chamber 34 through a gap in the wall 38. The arm 54 also carries a further annular chamber 56 of identical construction to the chamber 34 which is arranged, when in its operative position, to deliver air to cooling passages in a further mould body of the arrangement (not shown) thus, the chamber 34 and the chambers 56, respectively can feed air to two mould bodies which are adjacent to one another when the glassware forming machine is operating in the double gob mode. The arm 54 is secured by bolts 58 to a bracket 60 which is clamped to a vertical shaft 62. The vertical shaft 62 is that normally employed to move a funnel of the glassware forming machine into and out of its operative position on top of the blank mould of the machine. The shaft 62 is movable by conventional cam means operated by a pneumatic piston and cylinder assembly (not shown) for vertical movement and for pivoting movement about a central vertical axis thereof so that the arm 54 and the annular chambers 34 and 56 can be moved between their operative and out-of-the-way positions by a combination of these movements.

Air blown by the air blowing means which comprises a fan or a compressor (not shown) enters the arm 54 through a flexible pipe 64. The air pressure in the chamber 34 may be between 60 and 10 pounds per square inch (4.13 to 0.7 bars) above atmospheric pressure.

The illustrative mould arrangement also comprises water supply means operable to entrain droplets of water into the air blown by the blowing means to thereby increase the cooling effect of the air. The water supply means is shown diagrammatically in FIG. 1 and comprises a pipe 66 connected to a water main, a solenoid valve 68 operable to control the flow of water from the pipe 66, and a spray head 70 operable to spray droplets of water into the air flowing along the pipe 64. The pipe 64 is connected to a pipe 72 to which the fan which constitutes the air blowing means is connected, the flow of air between the pipes 72 and 64 being controlled by a solenoid valve 74.

In the operation of the glassware forming machine of which the illustrative mould arrangement, the side portions of the mould body 10 are moved together to define the mould cavity 12. When the side portions have moved together, the arm 54 is swung and moved vertically downwards into its operative position so that the air supplied thereby can flow into the passages 24. Once the chamber 34 is in its operative position, the solenoid valves 68 and 74 are opened so that air containing droplets of water can flow into the passages 24 from the chamber 34. Next, a gob of molten glass is dropped into the mould cavity 12 through the opening 18 with the funnel portion 20 acting to guide the gob into the cavity 12. Then the baffle 30 is moved into position on the mould body 12 by being swung into alignment with the opening 18 and then moved downwards so that the portion 32 thereof enters the funnel portions 20 of the mould body. The parison is now formed in the mould cavity 12 and the baffle 30 is removed to its out-of-the-way position. The valves 68 and 72 are now closed and the chamber 34 is then moved to its out-of-the-way position and the side portions are moved to their open position so that the parison can be removed from the mould for subsequent moulding into a container.

A mould arrangement in accordance with the invention can also be used as a final mould arrangement of a glassware forming machine of the individual section type which is arranged to mould parisons received in the mould cavity thereof into containers. In this case, a blowhead of the mould arrangement, through which air can be blown into the mould cavity to cause a parison therein to expand, is mounted in a centre of the annular chamber 34 for movement therewith. In this case the arm 54 is mounted on the moving means conventionally used for moving the blowhead between an operative position thereof in which it can blow air into the mould cavity and an out-of-the-way position thereof.

I claim:

1. A mould arrangement for use in a cyclicly operating glassware forming machine, the arrangement comprising a mould body defining a mould cavity in which molten glass can be moulded, the mould cavity having an upwardly facing opening, cooling passages extending vertically in the mould body and each having an opening in an upper surface of the mould body which extends around the opening of the mould cavity, and air delivery means operable to deliver cooling air to said passages through the openings thereof so that the air flowing in the passages acts to cool the mould body, the air delivery means comprising an annular chamber, moving means operable to move the annular chamber between an operative position thereof in which a lower surface of the chamber overlies the upper surface of the mould body and an out-of-the-way position thereof, and blowing means operable to blow cooling air into the annular chamber when the chamber is in its operative position, the annular chamber being arranged so that, when it is in its operative position, access may be obtained through the centre of the annular chamber to the opening of the mould cavity, the chamber having openings in its lower surface which, when the chamber is in its operative position, each communicate with an opening of one of the cooling passages so that air blown into the annular chamber passes through the openings into the cooling passages.

2. A mould arrangement according to claim 1, wherein each of the openings in the lower surface of the annular chamber contains a nozzle defining a passage for the air leaving the chamber, which passage has a portion communicating with the chamber which converges away from the chamber.

3. A mould arrangement according to either one of claims 1 and 2, wherein the arrangement also comprises water supply means operable to entrain droplets of water into the air blown by the blowing means to thereby increase the cooling effect of the air.

4. A mould arrangement according to either one of claims 1 or 2, wherein the cooling passages communicate with an annular groove formed in the mould body which provides a common exhaust for the passages.

5. A mould arrangement according to either one of claims 1 or 2, wherein the annular chamber is mounted on an arm which forms a passage for the cooling air between the blowing means and the annular chamber, the arm being mounted for vertical movement and for pivoting movement about a vertical axis so that the annular chamber can be moved between its operative and out-of-the-way positions by a combination of these movements.

6. A mould arrangement according to claim 5, wherein at least one further annular chamber is mounted on the arm for movement with said annular chamber, each further annular chamber being arranged, when in its operative position, to deliver air to cooling passages in a further mould body of the arrangement.

7. A mould arrangement according to either one of claims 1 or 2, wherein the mould arrangement is a blank mould arrangement of a glassware forming machine of the individual section type arranged to mould parisons from gobs of molten glass received in the mould cavity and the annular chamber is arranged, when in its operative position, to receive a baffle which acts to close the opening of the mould cavity.

8. A mould arrangement according to claim 7, wherein the mould body defines a funnel portion connecting the opening in the upper surface to the mould cavity and the moving means operable to move the annular chamber is the mechanism conventionally used to move a funnel into and out of alignment with the opening of the mould cavity so that the funnel can guide a gob of molten glass into the mould cavity 9. A mould arrangement according to either one of claims 1 or 2, wherein the mould arrangement is a final mould arrangement of a glassware forming machine of the individual section type arranged to mould parisons received in the mould cavity into containers and a blowhead of the mould arrangement, through which air can be blown into the mould cavity to cause a parison therein to expand, is mounted in the centre of the annular chamber for movement therewith.

* * * * *